(12) United States Patent
Doba

(10) Patent No.: US 6,658,311 B1
(45) Date of Patent: Dec. 2, 2003

(54) MAINTENANCE MANAGEMENT SYSTEM FOR PRESS LINE

(75) Inventor: Eiji Doba, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/526,722

(22) Filed: Mar. 16, 2000

(30) Foreign Application Priority Data

Mar. 19, 1999 (JP) .......................................... 11-076383

(51) Int. Cl.⁷ .............................................. G06F 19/00
(52) U.S. Cl. .......................... 700/95; 700/20; 700/108; 700/168; 700/206
(58) Field of Search ............................. 700/17, 20, 21, 700/65, 66, 83–85, 95, 108–111, 168, 169, 173, 174, 180, 206, 9

(56) References Cited

U.S. PATENT DOCUMENTS

| | | | | |
|---|---|---|---|---|
| 4,074,354 A | * | 2/1978 | Nakagawa et al. ............. 714/3 |
| 4,380,796 A | * | 4/1983 | Ostby ..................... 364/474.11 |
| 4,910,658 A | * | 3/1990 | Dudash et al. ............... 364/138 |
| 4,916,441 A | * | 4/1990 | Gombrich .................... 340/712 |
| 5,434,790 A | * | 7/1995 | Saka et al. ............. 364/468.17 |
| 5,566,092 A | * | 10/1996 | Wang et al. ................. 702/185 |
| 5,598,572 A | * | 1/1997 | Tanikoshi et al. ............. 712/30 |
| 5,608,657 A | * | 3/1997 | Conway et al. ............. 702/183 |
| 5,650,940 A | * | 7/1997 | Tonozuka et al. ........... 709/204 |
| 5,687,391 A | * | 11/1997 | Judd et al. .................... 710/15 |
| 5,774,688 A | * | 6/1998 | Georgitsis et al. .......... 395/500 |
| 5,793,963 A | * | 8/1998 | Tapperson et al. .......... 709/201 |
| 5,802,459 A | * | 9/1998 | Burke et al. .................. 455/90 |
| 5,919,250 A | * | 7/1999 | Shimokawa ................ 709/252 |
| 5,960,214 A | * | 9/1999 | Sharpe, Jr. et al. ........... 710/15 |
| 6,125,868 A | * | 10/2000 | Murphy et al. ................. 137/1 |
| 6,307,652 B1 | * | 10/2001 | Fassih-Nia et al. ......... 359/110 |
| 6,330,482 B1 | * | 12/2001 | McCain et al. ................ 700/9 |
| 6,385,497 B1 | * | 5/2002 | Ogushi et al. .............. 700/110 |

FOREIGN PATENT DOCUMENTS

| JP | 01174097 A | * | 7/1989 |
|---|---|---|---|
| JP | 06301615 A | * | 10/1994 |
| JP | 08202435 A | * | 8/1996 |
| JP | 2598693 | | 1/1997 |
| JP | 09218711 A | * | 8/1997 |
| JP | 10116113 A | * | 5/1998 |
| JP | 411039023 A | * | 2/1999 |
| JP | 11275111 A | * | 10/1999 |
| JP | 11282523 A | * | 10/1999 |
| JP | 2000214918 A | * | 8/2000 |

* cited by examiner

*Primary Examiner*—Maria N. Von Buhr
(74) *Attorney, Agent, or Firm*—Armstrong, Westerman & Hattori, LLP

(57) ABSTRACT

A maintenance management system for a press line which enables even one person to carry out efficient maintenance operations. For this purpose, in the maintenance management system, a communication cable for a network is laid inside the press line with a management computer being the starting point, and a connector capable of being connected to a communicable device is placed in at least one predetermined location on the communication cable. A portable input/output terminal, which is connected to the connector, incorporates software for optionally detecting and displaying maintenance information in the management computer, and which allows an operator to operate the software, is included. In response to a request command for detection and display from the portable input/output terminal, the management computer provides the corresponding information from the maintenance information to the portable input/output terminal

4 Claims, 1 Drawing Sheet

MAINTENANCE MANAGEMENT SYSTEM FOR PRESS LINE

TECHNICAL FIELD

The present invention relates to a maintenance management system for a press line, which can provide maintenance information of the press line at a pressing site.

BACKGROUND ART

Conventionally, as a maintenance management system for a press line, especially for a large-sized press line, there is a system which installs one supervisory computer (hereinafter, called a management computer) in a press line and makes it possible to provide various pieces of information regarding maintenance tasks in response to a worker's request. In such a system, the management computer conducts data communications with a plurality of controllers each consisting of, for example, a programmable logic controller (so-called PLC) or the like and respectively controlling a press machine and its peripheral devices, via a predetermined network to obtain various pieces of maintenance information of each device in the press line and to make it possible to display the same on a screen. As the aforesaid peripheral devices, a device for carrying in materials, a device for conveying formed goods, a device for carrying out the formed goods, and the like are cited. As the predetermined network, for example, a factory automation (FA) network is cited.

The followings are cited as concrete examples of the functions of the maintenance management system for a press line (for example, Japanese Patent No. 2598693).

(1) When detecting a faulty operation of an electronic device or an electric component (for example, a limit switch), its location is immediately identified and displayed on the screen of the management computer.

(2) Various pieces of information (makers, models, specifications, maintenance cords, replacement instructions, and the like) about components relating to the aforesaid electronic device or electric component with the faulty operation are detected from data base and displayed on the screen.

(3) When replacement of a component or the like is needed, the replacing component is automatically ordered.

(4) Input/output information of the controllers of a press machine and each peripheral device can be monitored.

As described above, various pieces of necessary information regarding the maintenance operations are provided, and the press line is maintained at high availability. Further, as an important function during a maintenance operation such as replacement of a faulty component of a press machine or the like, the system includes the function of facilitating maintenance operations and reducing operating hours by providing block diagrams of devices, components arrangement plans inside devices, wiring diagrams, piping diagrams, and the like on the screen as necessary, or the like.

However, there exist the following disadvantages in the aforesaid conventional maintenance management system for the press line.

When identifying the location of a section producing a trouble, a person in charge of maintenance looks at trouble information displayed on the screen of the management computer, and goes to the place near the site of the trouble based on the information to identify the component and the location. However, if he or she can't identify the trouble, he or she contacts another worker on standby near the management computer, for example, on a radio, and is given more detailed information. Alternatively, when it is not possible to team up with other workers, the person in charge has to return to the location of the management computer by himself or herself to obtain detailed information, and thereafter goes to the aforesaid site of trouble again. Then he or she repeats the above operation until the trouble is identified. Further, after identifying the component and the location, it is necessary to obtain information about the component replacement instructions and procedures, the machine starting-up procedures after replacement and the like, and therefore the person in charge has to return to the management computer once again, look at what is printed out, or be given the information by other workers.

As described above, since maintenance information is displayed on the screen of only one management computer, the person in charge of maintenance has to travel between the location of the trouble and the management computer again and again. However, in a large-sized press line for an automobile, for example, the length of the line usually ranges several tens of meters and the height thereof also ranges several meters. In such a case, the person in charge of maintenance has to travel the long distance between the management computer and the location of a trouble again and again as described above depending on the location and the nature of the trouble, or he or she has to proceed with operations while making contact with several workers. Consequently, the person in charge of maintenance needs to spend a great deal of effort and time for maintenance, thus causing the disadvantages of increasing the maintenance cost, reducing working efficiency, and reducing the availability of the press line.

SUMMARY OF THE INVENTION

In view of the above disadvantages, an object of the present invention is to provide a maintenance management system for a press line, which enables even one person to carry out efficient maintenance operations, and which is capable of increasing availability of the press line.

A maintenance management system for a press line according to the present invention is, in a maintenance management system for a press line including a management computer having maintenance information of the press line therein and producing a display of the maintenance information in response to a request of maintenance personnel to thereby control maintenance management, characterized in that a communication cable for a network is laid on a predetermined place inside the press line with the management computer being the starting point, and in that a connector capable of being connected to a device communicable via the communication cable is placed in at least one predetermined location on the communication cable, and the maintenance management system is characterized by further including a portable input/output terminal, which is connected to the connector, incorporates software for optionally detecting and displaying the maintenance information in the management computer by communications via the communication cable, and which allows an operator to operate the software, and is characterized in that in response to a request command for detection and display from the portable input/output terminal, the management computer provides the corresponding information from the maintenance information to the portable input/output terminal which outputs the request command.

Further, in the maintenance management system for the press line, the connectors may be placed at a plurality of predetermined locations on the communication cable. Furthermore, each of the portable input/output terminals may be connected to each of the plurality of connectors. Further, the portable input/output terminals may be connected to the plurality of connectors when necessary.

According to the above configuration, the communication cable for the network is placed at a predetermined place in the press line with the management computer being the starting point, and a connector for being connected to a communication device is provided at a predetermined number of locations, which is one or more, on this communication cable. The portable input/output terminal, which can be connected to the connector, incorporates the software which optionally detects and displays the maintenance information in the management computer by communications. In this configuration, an operator can operate the software. Thus, a person in charge of maintenance connects the portable input/output terminal to the connector at any location requiring maintenance operation. By carrying out the operation of requesting information necessary for the maintenance at the portable input-output terminal, the maintenance information corresponding to the request is provided from the management computer, and is displayed at the portable input/output terminal. Consequently, by utilizing the connector near the location of a trouble, the person in charge of maintenance does not have to travel the long distance between the location of the trouble and the management computer, thus enabling even one person to carry out maintenance operations with extreme efficiency. As the result, the maintenance operation hours are reduced, and availability of the press line is increased.

BEST MODE FOR CARRYING OUT THE INVENTION

Figure 1:
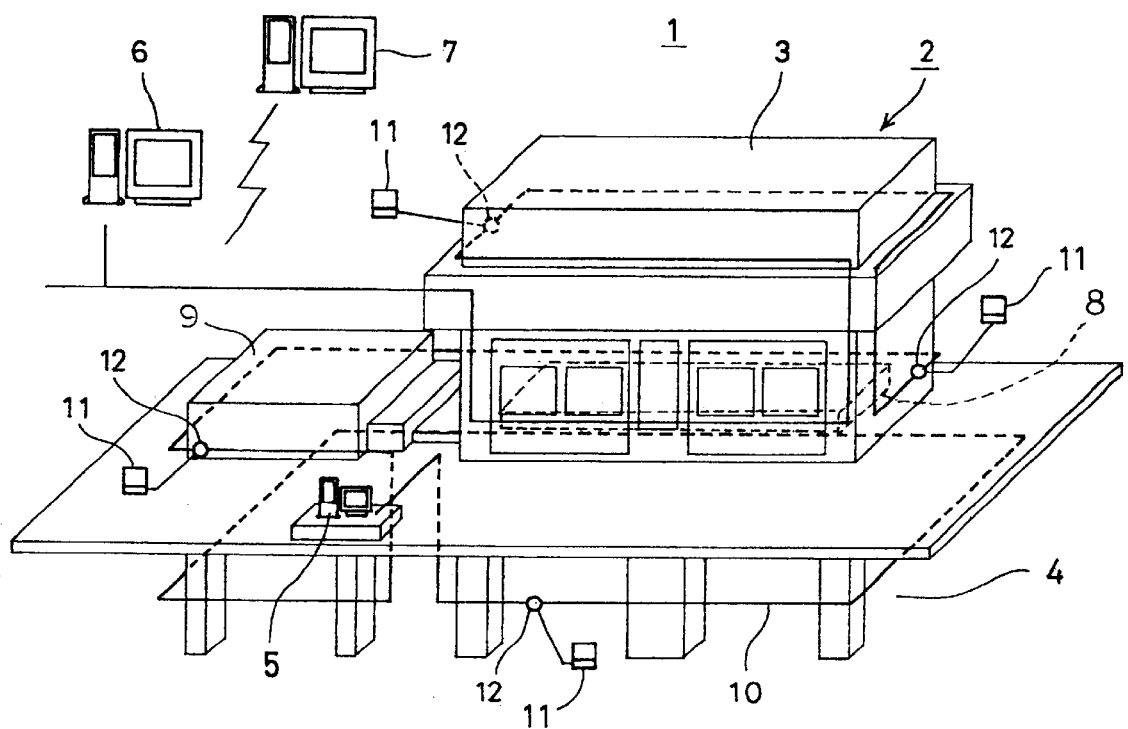
FIG. 1 is a perspective view showing a configuration of a maintenance management system for a press line according to the present invention.

A preferred embodiment according to the present invention will be described in detail below with reference to the drawing. Here, the description is made with a large-sized press taken as an example.

FIG. 1 is a perspective view showing a configuration example of a maintenance management system 1 for a press line. A large-sized press 2 includes a crown 3, a bolster 8, a slide (not illustrated), a conveying device (not illustrated) and the like on an aboveground part thereof. The large-sized press 2 also includes a bed not illustrated, a driving mechanism for the conveying device, various kinds of driving devices driven by hydraulic pressure, air pressure, electricity and the like in a pit 4 of an underground part. Around the large-sized press 2, a material feeding device 9 for feeding material, and a formed goods carrying out device (not illustrated) for carrying out formed goods from the large-sized press 2, and the like are placed.

A management computer 5 for managing maintenance information is installed near the large-sized press 2. A communication cable 10 for a network is laid around the aforesaid each peripheral device, control device, driving device and the like, which are placed in the press body, the crown 3, and the pit 4, with the management computer 5 as a starting point. A controller for each of the aforesaid devices is connected to the management computer 5 via the communication cable 10. The foremost end portion of the communication cable 10 is connected to a production management computer 6 and the like of the factory. The management computer 5 carries out data communications with he controllers for controlling respective devices in the press line, via the communication cable 10, thereby making it possible to obtain various pieces of management information of the press line. Further, connectors 12 capable of connecting to communication cables of portable input/output terminals 11 (they may consist of, for example, mobile computers) are provided at predetermined locations on the aforesaid communication cable 10 which is laid. A predetermined number of connectors 12 are provided at the locations where they are required for maintenance operations. Maintenance management software for providing various pieces of information according to an I/O request command from the portable input/output terminal 11 is installed in the management computer 5.

As for data communications which are carried out between the management computer 5 and each controller in the press line via the communication cable 10, any communication may be suitable if it has a standard which allows large capacity data communications at a high speed and construction of a network. As this communication standard, for example, Ethernet can be adopted.

As for software for controlling the maintenance management system 1, the Internet technology can be adopted. Specifically, a WEB server by the Internet technology is installed in the management computer 5, and input and output of information are managed by the WEB server. That is, information is read from a data file corresponding to each request in response to an information request command from each portable input/output terminal 11 by means of the WEB server, and the information which is read out is sent to the portable input/output terminal 11, which made the aforesaid information request, via the Internet communication. Browsing software (so-called browser ) by the Internet technology is incorporated in each of the portable input/output terminal 11 consisting of a mobile computer or the like. With use of the browsing software, a predetermined operation is performed at each of the portable input/output terminal 11. As a result of carrying out the operation, information needed in each field is detected from various kinds of maintenance information data files, which are stored in the management computer 5, and desired information can be displayed at the portable input/output terminal 11 at will.

The above WEB server, browsing software and the like have a high degree of reliability, and are easily available owing to the development of the Internet technology, and therefore they are extremely preferable to construct the maintenance management system 1 of a press line as in the above.

As the communication cable 10, an optical cable capable of constructing a network, a coaxial cable or two core twist cable, or the like can be used. When communications are carried out by Ethernet, the communication cable 10 consists of each kind of cable, a connector and the like of the Ethernet standard.

Next, the operation and the effects will be explained.

Normally, during press production, the management computer 5 inputs required information regarding maintenance such as each operation data, halt information, troubleshooting information, and the like from each controller of the press line, via the communication cable 10 at each predetermined time, and the management computer 5 displays the above information on the screen if necessary. When the maintenance operation is carried out after a trouble or the like occurs, if the location of the trouble is away from the management computer 5, a person in charge of maintenance connects the portable input/output terminal 11 to the connector 12 of the network, which is near the location of the trouble. Thereafter, he or she freely and optionally detects and reads information necessary for the maintenance from the management computer 5, by means of the portable input/output terminal 11 by a predetermined operation, and displays the same at the portable input/output terminal 11. As for the predetermined operation, when browsing software is used, a predetermined detection command is inputted. Accordingly, the person in charge of maintenance does not have to travel between the location of the trouble and the management computer 5 away therefrom many times, thus enabling him or her to carry out maintenance operations efficiently by himself or herself. As the result, maintenance operations are carried out with a high degree of efficiency, thus making it possible to reduce maintenance cost and increase availability of the press line.

Further, if Ethernet is adopted for the communication standard, communication with, for example, a production management computer 6 in a press factory can be easily achieved. As a result, when production is carried out, the management computer 5 receives a production command from the production management computer 6, which is based on a production program, and the production can be carried out in accordance with the command. Namely, a control signal is sent to each controller via the communication cable 10, thereby making it possible to operate the press line based on the production program to thereby carry out production. In this situation, it is possible to transmit production information, operation information of each device and the like to the production management computer 6. As the result, the press management system in the entire press factory can be easily constructed.

Further, as shown in FIG. 1, by the adoption of Ethernet, a maker side computer 7 possessed by a press maker can be easily connected with the management computer 5 of the maintenance management system for the press line according to the present invention by satellite communications or the like. According to the above connection, an expert service person of the press maker directly obtains the maintenance information of the management computer 5 from, for example, a service center far away via the above network, and troubleshooting and maintenance can be carried out more technically based on the information. Further, on the other hand, a person in charge of maintenance, who is a user of the press machine, can obtain more detailed, or more suitable maintenance information from the service center or the like of the press maker via the above network.

Accordingly, maintenance operations can be carried out more efficiently and securely.

Further, as software used for the maintenance management system 1 of the press line, a WEB server based on the Internet technology, browsing software and the like are adopted, thus making it possible to easily construct a highly reliable system. In addition, the function of software is easily improved.

What is claimed is:

1. A maintenance management system for a press line including a management computer having maintenance information of the press line therein and producing a display of said maintenance information in response to a request of maintenance personnel to thereby control maintenance management, wherein a communication cable for a network is laid on each peripheral device, control device and driving device which are installed inside said press line in a way that said management computer is the starting point of the communication cable and a production management computer is at the end of the communication cable; and wherein a connector capable of being connected to a device communicable via said communication cable is placed in at least one predetermined location on said communication cable, said maintenance management system further comprising a portable input/output terminal, which is connected to said connector, incorporates software for optionally detecting and displaying said maintenance information in said management computer by communications via said communication cable, and which allows an operator to operate said software, and in response to a request command for detection and display from said portable input/output terminal, said management computer providing the corresponding information from said maintenance information to said portable input/out terminal which outputs the request command, wherein said management computer installs a web server.

2. The maintenance management system for the press line in accordance with claim 1, wherein said connectors are placed at a plurality of predetermined locations on said communication cable.

3. The maintenance management system for the press line in accordance with claim 2, wherein each of said portable input/output terminals is connected to each of said plurality of connectors.

4. The maintenance management system for the press line in accordance with claim 2, wherein said portable input/output terminals are connected to said plurality of connectors when necessary.

* * * * *